Aug. 6, 1957   J. H. WINCHESTER ET AL   2,801,947
METHOD OF MAKING CONTOURED FLOCKED ARTICLES
Filed June 15, 1954
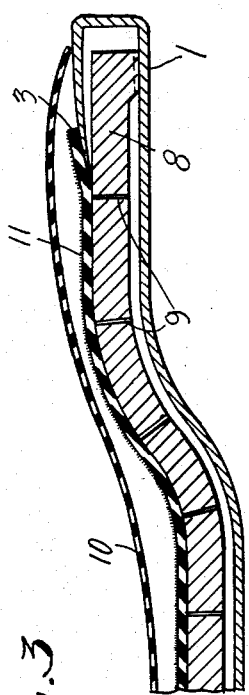
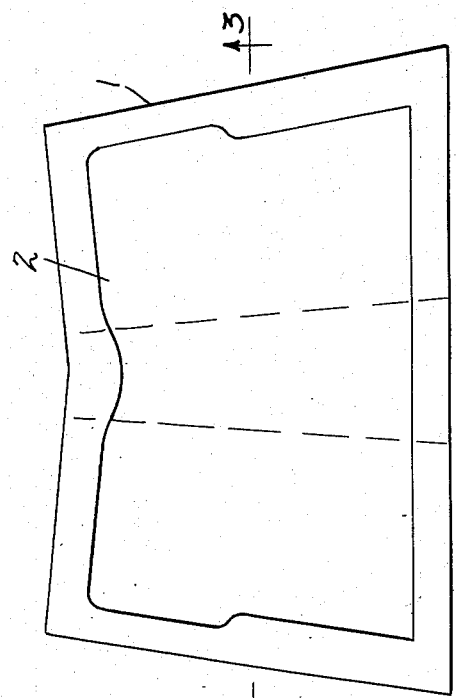
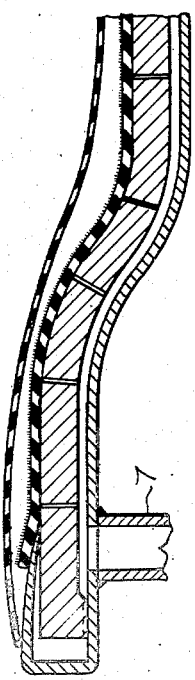
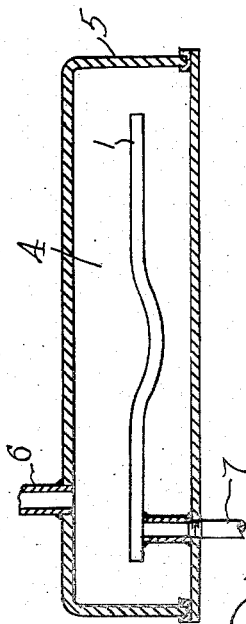
INVENTORS
JOHN H. WINCHESTER AND
BY WILLIAM S. EDWARDS
Oberlin & Limbach
ATTORNEYS.

---

United States Patent Office 2,801,947
Patented Aug. 6, 1957

---

2,801,947

METHOD OF MAKING CONTOURED FLOCKED ARTICLES

John H. Winchester, Euclid, Ohio, and William S. Edwards, Grosse Pointe Farms, Mich., assignors to The Eagle-Picher Company, Cincinnati, Ohio, a corporation of Ohio Application June 15, 1954, Serial No. 436,888

9 Claims. (Cl. 154—110)

This invention relates as indicated to contoured flocked articles, and more particularly to articles such as contoured auto mats having a rubber or similar plastic base with a flocked surface adhered thereto.

A great many automotive floor mats are now made of carpet tailored to proper contour. This material is expensive and the labor required to shape and tailor the same is likewise expensive. Such automotive floor coverings may ordinarily cost approximately $15 each. On the other hand, the common rubber automotive floor mat is relatively inexpensive, geenrally costing less than $5, but is not ordinarily nearly as ornamental. It is a principal object of the present invention to provide an inexpensive rubber automotive floor mat having a flocked surface to afford an effect similar to that obtained with a good pile carpet.

It has been found possible to apply flock to a flat rubber mat utilizing either an electrostatic field or vibrating mechanism. When using the electrostatic method to apply flock to a previously contoured (e. g. humped) rubber floor mat, however, it was found that the flock tends to orient itself in perfect parallelism rather than normal to all parts of the mat surface. This affords an odd visual effect quite different from that afforded by true pile carpet. Mechanical vibratory methods are also well known and excellent for flocking wide flat surfaces but have not proved satisfactory for flocking large contoured sheet materials such as automotive floor mats.

Flock may be applied to a flat sheet of uncured rubber base stock, using an appropriate cement on one surface thereof, and then after curing or drying the cement firmly to adhere the flock, placing the blank in a suction mold with the flocked surface away from the mold and there curing the base stock. When the finished article is removed from the mold, it will be appreciated that the flock will be on the concave surface instead of the convex surface as desired for the usual automotive mat, and it is therefore necessary to reverse the same by "popping out" such concave portions in the other direction. This method did not produce satisfactory results for the reason that the rubber base stock would tend to split at the angles between the different planes. It is accordingly another object of our invention to provide a method of forming flock coated articles of contoured sheet material, forming such article after application of the flock, and then reversing the contour to provide the finished article with the flock on the convex surface thereof.

A further object of our invention is to provide flocked contoured articles having convex flocked contours in which the flock presents a uniform appearance and is oriented substantially normal to the convex surface in all places.

Other objects of the invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 1 is a general top plan view of a suction mold adapted to be employed in accordance with our invention;

Fig. 2 is a transverse section through a curing oven including such mold therewithin; and Fig. 3 is an enlarged transverse section taken on the line 3—3 on Fig. 1, illustrating the manner of molding a contoured auto mat in accordance with our invention.

Referring now more particularly to the annexed drawing, Fig. 1 is a diagrammatic top plan view of a contour suction mold 1 having an upper suction mold surface 2 upon which a rubber mat blank 3 may be placed. As illustrated diagrammatically in Fig. 2, such mold 1 may be mounted within a chamber 4 enclosed by a removable cover 5 to which steam or hot air may be admitted through inlet 6 to cure the rubber mat. Suction may be applied to the interior of the suction mold 1 through connection 7.

In accordance with our invention, flocked rubber mats may be cured either on positive molds (having convex molding surfaces) or negative molds (having concave molding surfaces, the mat being reversed after molding). It is conventional in the manufacture of ordinary rubber mats to cure the same on negative molds in order that the mat blank may take the desired texture from the mold surface. In accordance with our invention, it will sometimes be preferable to cure the article in reverse and sometimes to cure it in the form in which it will be utilized. Figure 3 of the drawing illustrates in cross-section a suction mold assembly for curing the mat in reverse. It will be appreciated, however, that the contours may be formed as desired.

The suction mold thus illustrated is of generally conventional construction, comprising a shaped platen 8 having a plurality of suction vents such as 9 therethrough whereby suction may be applied at numerous spaced points on the outer surface of the mold platen to draw the uncured rubber mat blank 3 firmly against the mold contour. A rubber blanket 10 may be placed over the blank 3 to protect the exposed flock surface 11 of the blank from the action of the steam during the curing operation. Most flock materials are better protected from direct contact with the steam, and it is not feasible to place the flock coated surface of the mat downwardly against the mold platen 8 since the cement holding the flock has not yet cured and there is in any case danger of damaging the uniform flocked surface.

We have found that it is very important that the flock or pile material 11 be adhered to the blank 3 by means of a cement or adhesive which does not cure or set before the material of blank 3 sets. If the adhesive is cured preliminarily, the subsequent curing of the base stock tends to stress and tear the latter where substantially contoured, particularly when such contours are thereafter reversed.

Suitable flocks may be made of rayon, nylon, dynel, wool and cotton, for example, and may be employed singly and in combination. They will range ordinarily in deniers of from 5 to 50, and in lengths from ½ millimeter to ½ inch.

Suitable cement formulations commercially available include MM #EXP176614 of Angier Products Co. and #B9540 of Pierce Stevens Co. Two detailed cement formulations suitable for our purpose are as follows:

Neoprene cement:                                     Parts
   Neoprene W _____ 100
   Neozone A (antioxidant) _____ 2
   Magnesium oxide _____ 4
   Carbon black _____ 75
   Processing oil _____ 10
   Zinc oxide _____ 5
   Paracoumarone indene resin _____ 30
   Xylene sufficient to make a mixture having 35%
      to 40% total solids.

Natural rubber:
   Smoked sheets _____ 100
   Stearic acid _____ 2
   Neozone A (antioxidant) _____ 1
   Sulfur _____ 2
   Zinc oxide _____ 4
   Altax accelerator _____ 1
   Monex accelerator _____ 0.1
   Carbon black _____ 50
   Paracoumarone indene resin _____ 10
   Gasoline sufficient to make a mixture having
      30% to 35% solids.

While a variety of rubber and synthetic rubber base stocks may be employed in accordance with our invention, a relatively inexpensive but satisfactory base stock for automobile mats and the like is as follows:

|  | Parts |
|---|---|
| Natural rubber | 8.05 |
| Modified whole tire reclaim (non-staining) | 81.15 |
| Semi reinforcing carbon black | 3.65 |
| Softener (stearic acid) | .50 |
| Black ground cured scrap (15 mesh) | 5.00 |
| Sulphur | .80 |
| Zinc oxide | .40 |
| Accelerators (benzothiazyl disulfide) | .45 |
|  | 100.00 |

This base stock is compounded to suitable batch size (e. g. 450 pounds) and placed in a Banbury mixer where the rubber and reclaim is broken down and blended for a two-minute period. The remaining materials are then added and mixing continued until thoroughly mixed, usually about four more minutes. The batch is next dropped on a conventional rubber mill and blended by working the stock from one end to the other for about two minutes. It can then be slabbed off, cooled, stacked and stored, or by suitable conveyor means a ribbon of stock can be cut with take-off knives and conveyed to the warm-up or blending rolls of the calender warm-up mills. Similar belts and knives are used to bring the stock to the calender which is set to a definite gauge, such as 80, plus or minus 3.

The calendered sheet which now has a definite width and thickness is fed through a soaping solution (2% Ivory soap) which is applied to one side only. A zinc stearate slurry is applied to the opposite side and excess of both liquids is removed by means of squeeze rolls. The treated sheet material then passes through a cooling chamber to bring its temperature below 125° F. and to dry so that it may be "clicked" to approximate mat size and the resultant mat blanks stacked.

The uncured mat blank is coated on one surface with a thin layer of the adhesive and, while still flat, the flock is applied to such coated surface, either by the well-known electrostatic method or with mechanicall vibration. The cement will now be dried without, however, curing or setting the same.

The flock coated mat is next placed on the suction mold with the flocked surface up, such surface being covered by the rubber blanket 10 or like protective shield or cover, such as a thin box-shaped lid. The blank is molded through application of suction and is then cured in steam chamber 4 for a period of, for example, six minutes at 310° F. The rubber stock will cure in the first four or five minutes and the cement will cure later. If desired or necessary, the cured mat may be treated with dry heat after removal from the mold to finish curing of the cement. The essential factor is that the cement must be selected to resist cure until the rubber base stock has fully conformed to the mold contours and surface design, if any, and has taken an initial set. Such initial set is largely achieved in the first minute of cure at 310° F. with the materials mentioned.

In the case of some cements, a preliminary heat treatment at a temperature on the order of 200° F. may be necessary or desirable to drive off the volatiles, but the cement should not be sufficiently heated at this stage permanently to set the same. If the cement is set prior to the molding operation and substantial curing of the blank to which it adheres, stresses will be built up in such blank especially where changes in contour occur which tend to cause cracking and splitting of the same.

Inasmuch as the flock was applied to the blank while the latter was flat, the flock filaments are oriented normal to the surface of the blank and preserve such orientation during subsequent deformation of the blank in the molding process.

The cement or adhesive for adhering the flock to the rubber surface should be compatible with such surface and will accordingly ordinarily be some type of rubber cement. Steam at, for example, 60 p. s. i. may be admitted to the steam chamber or oven to effect the cure, the cement being selected to have a longer curing time than the blank or base stock. Of course, other base materials may be employed such as the polyvinyl chlorides, neoprene, and other synthetic rubbers including GR–S and Buna–N. Likewise, textile and other sheet materials may be coated with such base materials prior to flocking and the most suitable cement or adhesive will depend somewhat on the base stock employed. In some cases, cements may be utilized which require a higher curing temperature than the base stock and may accordingly be cured and set after the base stock has taken the desired contour and gone through any shrinking stage to which it may be subject prior to setting. The cement, even though more or less dried, is capable of a degree of plastic flow prior to setting which accommodates the forming of the article to contour without building up undesirable stresses.

It is not important to our invention whether an electrostatic or mechanical "beater" method is employed in the application of the flock so long as a uniform surface is produced. Obviously, a wide variety of different articles may be manufactured utilizing the principles of our invention where the flock is applied to a flat surface and the article formed to desired contour prior to setting of the cement or adhesive so that the latter does not resist the forming operation. Thus, flock may be applied to rubber, polyvinyl chloride, paper and other sheet materials which may then be formed into articles such as contour mats, hats, seat covers and the like. Conventional methods of applying flock are illustrated and described in the booklet "Cellusuede Flock," obtainable from Cellusuede Products, Inc., Rockford, Illinois.

Other modes of applying the principle of the invention may be employed, change being made as regards the details described, provided the features stated in any of the following claims or the equivalent of such be employed.

We therefore particularly point out and distinctly claim as our invention:

1. The method of making a flocked automotive contour floor mat which comprises the steps of making an uncured rubber mat blank, coating a surface of such blank with a compatible rubber cement having a longer curing time to set than does such rubber blank, flocking such coated surface with flock filaments while such surface is flat to produce a uniform flocked surface with the flock filaments parallel to each other and normal to the blank, drying such cement without setting the same, molding the flocked blank in a contoured suction mold with such flocked surface away from the mold to impart a curved contour to a portion of such blank, covering such flocked surface with a protective rubber blanket, curing such blank by steam, and subsequently to the foregoing steps completing the cure of such blank and setting such cement by application of dry heat to the flocked surface.

2. The method of making a flocked automotive contour floor mat which comprises the steps of making an uncured rubber mat blank, coating a surface of such blank with a compatible rubber cement having a longer curing time to set than does such rubber blank, flocking such coated surface with flock filaments while such surface is flat to produce a uniform flocked surface with the flock filaments parallel to each other and normal to the blank, drying such cement without setting the same, molding the flocked blank in a contoured suction mold with such flocked surface away from the mold to impart a curved contour to a portion of such blank, such mold having a hollow to shape the blank with a hump portion with such flocked surface forming the inner concave surface thereof, covering such flocked surface with a protective rubber blanket, curing such blank by steam, subsequently to the foregoing steps completing the cure of such blank and setting such cement by application of dry heat to the flocked surface, and then reversing such hump to cause such flocked surface to form the convex surface thereof.

3. The method of making a flocked automotive contour floor mat which comprises the steps of making an uncured rubber mat blank, coating a surface of such blank with a compatible rubber cement having a longer curing time to set than does such rubber blank, flocking such coated surface with flock filaments while such surface is flat to produce a uniform flocked surface with the flock filaments parallel to each other and normal to the blank, drying such cement without setting the same, molding the flocked blank in a contoured suction mold with such flocked surface away from the mold to impart a cured contour to a portion of such blank, curing such blank, and subsequently to the foregoing steps completing the cure of such blank and setting of such cement.

4. The method of making a flocked automotive contour floor mat which comprises the steps of making an uncured rubber mat blank, coating a surface of such blank with a compatible rubber cement having a longer curing time to set than does such rubber blank, flocking such coated surface with flock filaments while such surface is flat to produce a uniform flocked surface with the flock filaments parallel to each other and normal to the blank, drying such cement without setting the same, molding the fllocked blank in a contoured suction mold with such flocked surface away from the mold to impart to curved contour to a portion of such blank, such mold having a hollow to shape the blank with a hump portion with such flocked surface forming the inner concave surface thereof, curing such blank, subsequently to the foregoing steps completing the cure of such blank and setting of such cement, and then reversing such hump to cause such flocked surface to form the convex surface thereof.

5. The method of making a flocked contoured sheet rubber article which comprises the steps of making an uncured rubber blank, coating a surface of such blank with a compatible cement having a longer curing time to set than does such rubber blank, flocking such coated surface with flock filaments while such surface is flat to produce a uniform flocked surface with the flock filaments parallel to each other and normal to the blank, drying such cement without setting the same, molding the flocked blank in a contoured suction mold with such flocked surface away from the mold to impart a curved contour to a portion of such blank, curing such blank, and subsequently to the foregoing steps completing the cure of such blank and setting of such cement.

6. The method of making a flocked contoured sheet rubber article which comprises the steps of making an uncured rubber blank, coating a surface of such blank with a compatible cement having a longer curing time to set than does such rubber blank, flocking such coated surface with flock filaments while such surface is flat to produce a uniform flocked surface with the flock filaments parallel to each other and normal to the blank, drying such cement without setting the same, molding the flocked blank in a contoured suction mold with such flocked surface away from the mold to impart a curved contour to a portion of such blank, such mold having a hollow to shape the blank with a hump portion with such flocked surface forming the inner concave surface thereof, curing such blank, subsequently to the foregoing steps completing the cure of such blank and setting of such cement and then reversing such hump to cause such flocked surface to form the convex surface thereof.

7. The method of making a flocked contoured rubber-like article which comprises the steps of making an uncured blank of rubber-like plastic material selected from the class consisting of rubber, polyvinyl chloride, neoprene, GR–S, and Buna–N, coating a surface of such blank with a compatible cement, flocking such coated surface with flock filaments while such surface is flat, shaping such flocked surface to desired curved contour, curing such shaped blank while such cement is still capable of plastic flow, and subsequently to the foregoing steps setting such cement.

8. The method of making a flocked contoured rubber-like article which comprises the steps of making an uncured blank of rubber-like plastic material selected from the class consisting of rubber, polyvinyl chloride, neoprene, GR–S, and Buna–N, coating a surface of such blank with a compatible cement, flocking such coated surface with flock filaments shaping such flocked surface to desired curved contour and curing such shaped blank while such cement is still capable of plastic flow, and subsequently to the foregoing steps setting such cement.

9. The method of making a flocked contour sheet rubber article which comprises the steps of making an uncured rubber blank, coating a surface of such blank with a compatible cement, flocking such coated surface with flock filaments, molding the flocked blank in a mold to curved contour with the flocked surface away from the mold, curing such blank, and subsequently to the foregoing steps setting such cement.

References Cited in the file of this patent
UNITED STATES PATENTS

| Number | Name | Date |
|---|---|---|
| 1,617,588 | Geer | Feb. 15, 1927 |
| 1,617,707 | Geer | Feb. 15, 1927 |
| 2,077,514 | Callahan | Apr. 20, 1937 |
| 2,136,827 | Schur | Nov. 15, 1938 |
| 2,156,238 | Frankmann et al. | Apr. 25, 1939 |
| 2,171,728 | Lee et al. | Sept. 5, 1939 |
| 2,187,140 | Faris et al. | Jan. 16, 1940 |
| 2,258,238 | Collins | Oct. 7, 1941 |
| 2,358,204 | Bird | Sept. 12, 1944 |
| 2,688,577 | Fischer | Sept. 7, 1954 |